(12) United States Patent
Imagawa (10) Patent No.: US 10,877,298 B2
(45) Date of Patent: Dec. 29, 2020

(54) HEAD-MOUNTED DISPLAY DEVICE

(71) Applicant: Maxell, Ltd., Kyoto (JP)

(72) Inventor: Seiji Imagawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/577,388

(22) PCT Filed: Jun. 16, 2015

(86) PCT No.: PCT/JP2015/067364
§ 371 (c)(1),
(2) Date: Nov. 28, 2017

(87) PCT Pub. No.: WO2016/203556
PCT Pub. Date: Dec. 22, 2016

(65) Prior Publication Data
US 2018/0173017 A1 Jun. 21, 2018

(51) Int. Cl.
*G02C 11/00* (2006.01)
*G02B 27/01* (2006.01)

(52) U.S. Cl.
CPC .......... *G02C 11/10* (2013.01); *G02B 27/0176* (2013.01); *G02B 27/0179* (2013.01); *G02B 2027/0138* (2013.01); *G02B 2027/0156* (2013.01); *G02B 2027/0178* (2013.01); *G02B 2027/0181* (2013.01)

(58) Field of Classification Search
None
See application file for complete search history.

(56) References Cited

U.S. PATENT DOCUMENTS

2006/0119539 A1   6/2006  Kato et al.
2008/0169998 A1*  7/2008  Jacobsen ............ G02B 27/0172
                                              345/8
2008/0291277 A1* 11/2008  Jacobsen ............ G02B 27/0172
                                              348/158

(Continued)

FOREIGN PATENT DOCUMENTS

JP        11-75141 A      3/1999
JP     2000-249972 A      9/2000

(Continued)

OTHER PUBLICATIONS

International Search Report of PCT/JP2015/067364 dated Sep. 15, 2015.

*Primary Examiner* — William R Alexander
*Assistant Examiner* — Gary W O'Neill
(74) *Attorney, Agent, or Firm* — Mattingly & Malur, PC (57) ABSTRACT

A head-mounted display device 1 includes: an image display unit 2 that displays an image; arms 3a and 3b that support the image display unit; and attachment parts 4a and 4b that attach the arms to glasses 100. The arm is formed by a first arm 3a supporting the image display unit and a second arm 3b bonded to the attachment part 4b and includes: a first moving part 5 that can rotate the image display unit 2 with respect to the first arm 3a; and a second moving part 6 that can rotate the first arm 3a to be folded back with respect to the second arm 3b. Directions of a rotation axis of the first moving part 5 and a rotation axis of the second moving part 6 are approximately orthogonal to each other. Accordingly, the head-mounted display device 1 can be stored integrally with the glasses 100.

12 Claims, 10 Drawing Sheets

(56) References Cited

U.S. PATENT DOCUMENTS

| | | | |
|---|---|---|---|
| 2010/0245757 A1 | 9/2010 | Sugihara et al. | |
| 2013/0141690 A1* | 6/2013 | Taylor | G02C 7/085 351/159.39 |
| 2013/0235331 A1* | 9/2013 | Heinrich | G02C 11/10 351/158 |
| 2015/0212329 A1* | 7/2015 | Sugihara | G02C 5/2209 351/158 |
| 2015/0378160 A1* | 12/2015 | Lee | G02B 27/0172 345/8 |

FOREIGN PATENT DOCUMENTS

| | | |
|---|---|---|
| JP | 2004-233781 A | 8/2004 |
| JP | 2004-233904 A | 8/2004 |
| JP | 2010-516186 A | 5/2010 |
| JP | 2010-124339 A | 6/2010 |
| JP | 2010-226660 A | 10/2010 |
| JP | 2010-226680 A | 10/2010 |

* cited by examiner

HEAD-MOUNTED DISPLAY DEVICE

TECHNICAL FIELD

The present invention relates to a head-mounted display device having superior storability at the time of being mounted in glasses and used.

BACKGROUND ART

As head-mounted display devices (hereinafter, abbreviated to HMDs), there are a "separation type" mounted in a separate body such as glasses and an "integration type" mounted at a user's body like glasses. In any of the cases, when an HMD is used, it is necessary to arrange a display unit of the HMD within user's sight.

As a technology relating to position adjustment of a display unit of an HMD, in Patent Document 1, "a head-mounted display including a display unit projecting light of an image to user's eyes at the tip end thereof and an arm having a fixing portion, which is detachably attached to a collar of a cap, enabling fixing at the base end thereof, the arm being configured to change a relative positional relation and an angle between the base end portion and the tip end portion" has been disclosed.

In addition, in Patent Document 2, a head-mounted display has been disclosed "which includes an actuator used for displacing an image output unit between a projecting state and a retracting state, wherein an image viewing state is formed when the image output unit is in the projecting state in a state in which a support portion is mounted in the head portion of a user."

Furthermore, in Patent Document 3, a display device "including a second casing including a reflection optical system used for guiding light modulated by the optimal modulation means to one of user's left and right eyeballs which is attached to be rotatable with respect to the first casing" has been disclosed.

CITATION LIST

Patent Document
  Patent Document 1: JP 2010-124339 A
  Patent Document 2: JP 2004-233904 A
  Patent Document 3: JP 2000-249972 A

SUMMARY OF THE INVENTION

Problems to be Solved by the Invention

According to an adjustment mechanism described in Patent Document 1, the display unit can be arranged at a position at which the display unit can be easily seen by a user. In addition, according to the actuator described in Patent Document 2 or the second casing described in Patent Document 3, in a case where a user does not see an image of the HMD, the display unit can retreat outside the sight.

In the case of the separation type in which the HMD is mounted in glasses or the like, by arranging the display unit of the HMD in front of glass lenses, even in a case where the user's vision needs to be corrected due to myopia, hyperopia, or the like, the glasses correct the vision. Accordingly, although the HMD displays only a fixed image, the user can see a normal image. In other words, in a case where an unspecified large number of users routinely use an HMD, it can be regarded that the separation-type HMD has a degree of convenience to be higher than the integration-type HMD requiring the correction of a vision.

On the other hand, in a case where the HMD is removed from the body, a structure having superior storability and being difficult to damage even in the case of being handled disorderly more or less is desirable. In the case of the integration type, since a system is formed by only the HMD, there is less restriction on the size and the shape at the time of storage, and a structure that is smaller and allows easy storage can be freely designed. However, in the case of the separation type, since the HMD is used with being mounted in glasses or the like, when a user puts off the glasses, the display unit of the HMD is in the state protruding toward the front side of glass lenses, and, also in a case where the glasses are stored with being folded, the HMD is in the state protruding from the glasses, and accordingly, it is difficult to store the HMD, and there is concern that the HMD is damaged. In the patent documents described above, there is no consideration of the storability of the HMD in the separation-type HMD.

An object of the present invention is to provide a structure in which, in a head-mounted display device of a glass attachment type, the head-mounted display device does not protrude from glasses and can be stored integrally with the glasses when the glasses are removed from the body and are stored.

Solutions to Problems

According to the present invention, there is provided a head-mounted display device including: an image display unit that displays an image; an arm that supports the image display unit; and an attachment part that attaches the arm to glasses. The arm is formed by a first arm supporting the image display unit and a second arm bonded to the attachment part and includes: a first moving part that can rotate the image display unit with respect to the first arm; and a second moving part that can rotate the first arm to be folded back with respect to the second arm. Directions of a rotation axis of the first moving part and a rotation axis of the second moving part are approximately orthogonal to each other.

In addition, according to the present invention, there is provided a head-mounted display device including: an image display unit that displays an image; an arm that supports the image display unit; and an attachment part that attaches the arm to glasses. The arm is formed by a first arm supporting the image display unit and a second arm bonded to the attachment part and includes: a first moving part that can rotate the image display unit with respect to the first arm; and a second moving part that can extend or contract the first arm in a longitudinal direction with respect to the second arm. A direction of a rotation axis of the first moving part and an extending/contracting direction of the second moving part are approximately parallel to each other.

Effects of the Invention

According to the present invention, when glasses are stored, a head-mounted display device does not protrude from the glasses, and the device can be prevented from being damaged, and the head-mounted display device can be stored integrally with the glasses, whereby the convenience is improved.

MODE FOR CARRYING OUT THE INVENTION

Hereinafter, head-mounted display devices (hereinafter, referred to as HMDs) according to embodiments of the present invention will be described with reference to the drawings.

Embodiment 1

Figure 1:
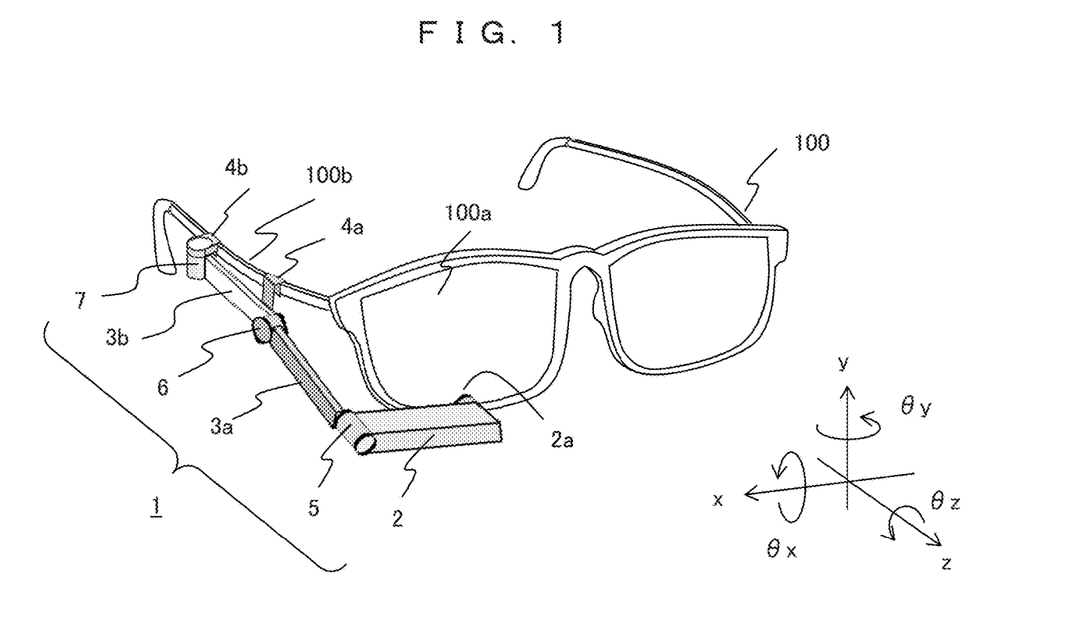
FIG. 1 is a perspective view that illustrates a head-mounted display device (HMD) according to Embodiment 1.

FIG. 1 is a perspective view that illustrates a head-mounted display device (HMD) according to Embodiment 1 and illustrates a use state in which an HMD is attached to glasses.

An HMD 1 of a separation type includes an image display unit 2 that displays an image and arms 3a and 3b that support the image display unit and is mounted at a temple (side) 100b of glasses 100 by using attachment parts 4a and 4b. The image display unit 2 has an optical system 20 built therein and displays an image from a display surface 2a. The arms are formed by a front part 3a and a rear part 3b and have a signal processing unit 30 transmitting image data to be displayed on the image display unit 2 built therein.

In the HMD 1, a first moving part 5 is included between the image display unit 2 and the arm 3a, a second moving part 5 is included between the arms 3a and 3b, and a third moving part 7 is included between the arm 3b and the attachment part 4b, and the first, second, and third moving parts are configured to be rotatable. FIG. 1 illustrates direction axes. The visual line direction of a user wearing the glasses 100 is z, the horizontal direction is x, and the vertical direction is y, and rotation directions with respect to the axes are θz, θx, and θy. In other words, the first moving part 5 can be rotated in the direction θz, the second moving part 6 can be rotated in the direction θx, and the third moving part 7 can be rotated in the direction θy, and the rotation axes are approximately orthogonal to each other. It is apparent that the rotation axis directions of the moving parts 5, 6, and 7 are precisely neither parallel nor vertical to the visual line direction of the glasses 100 (user) as a result of positional adjustment of the image display unit 2 of the HMD 1.

Users using the HMD 1 have various visions such as myopia, astigmatism, hyperopia, and the like and wear glasses 100 for correcting the visions. The image display unit 2 is arranged on the front face of a lens 100a of the glasses, in other words, on a side opposite to a user's eye (here, a right eyeball) with the lens 100a interposed therebetween, and the display surface 2a of the image display unit 2 is adjusted to a position at which an image can be easily seen by the user.

By arranging as such, an image displayed on the display surface 2a of the HMD 1 is corrected by the glass lens 100a to reach at the user's eye, and accordingly, the HMD 1 does not need to correct the displayed image in accordance with a user's vision.

Figure 2A:
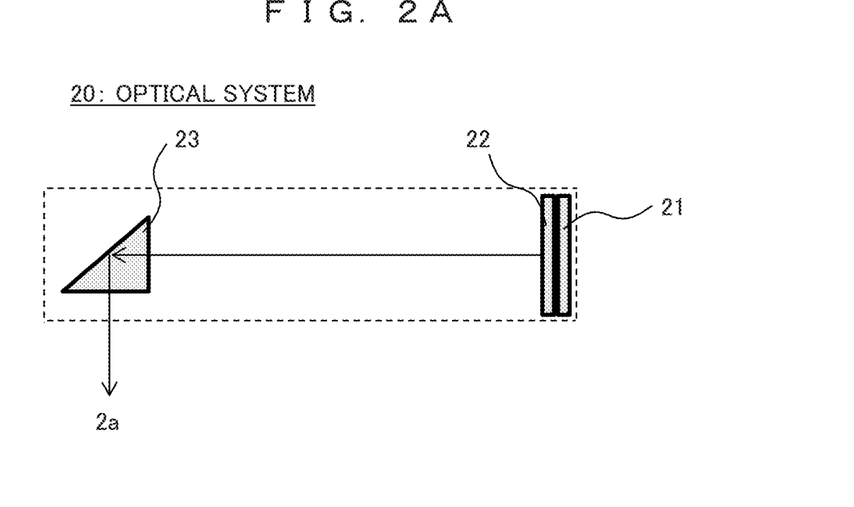
FIG. 2A is a top view that illustrates an example of the configuration of an optical system 20 of an image display unit 2.
Figure 2B:
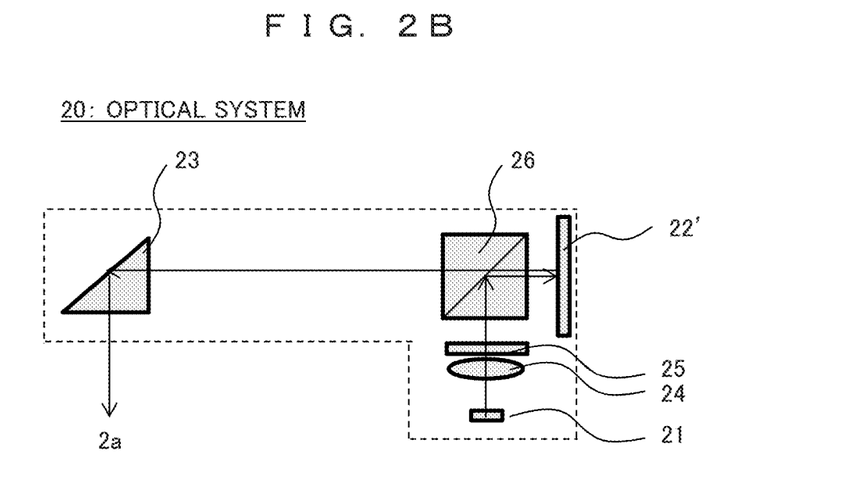
FIG. 2B is a top view that illustrates an example of the configuration of the optical system 20 of the image display unit 2.

FIGS. 2A and 2B are top views that illustrate examples of the configuration of the optical system 20 of the image display unit 2.

In the case illustrated in FIG. 2A, light emitted from a light source 21 such as an LED is emitted to an image generating device 22 of a transmission type such as a liquid crystal device to be image light, is reflected by a mirror 23 to be projected to the user's eye from the display surface 2a. The image generating device 22 converts display data transmitted from the signal processing unit 30 to be described later into a display image.

In the case illustrated in FIG. 2B, light emitted from a light source 21 such as an LED passes through a lens 24, a polarizer 25, and a polarizing prism 26, and is emitted to an image generating device 22' of a reflection type such as a liquid crystal on silicon (LCOS). Image light generated by the image generating device 22' is transmitted through the polarizing prism 26, reflected by a mirror 23, and is projected to a user's eye from the display surface 2a.

In this way, in the image display unit 2, a light source configuring the optical system 20 such as an LED, an image generating device such as such a liquid crystal device, and optical components such as lenses and mirrors are stored together. Accordingly, when the image light generated by the image generating device 22 is transmitted to the display surface 2a, the influence of motions of the moving parts 5, 6, and 7 described above is not easily received, and the occurrence of a positional deviation of an image to be displayed can be avoided.

Figure 3:
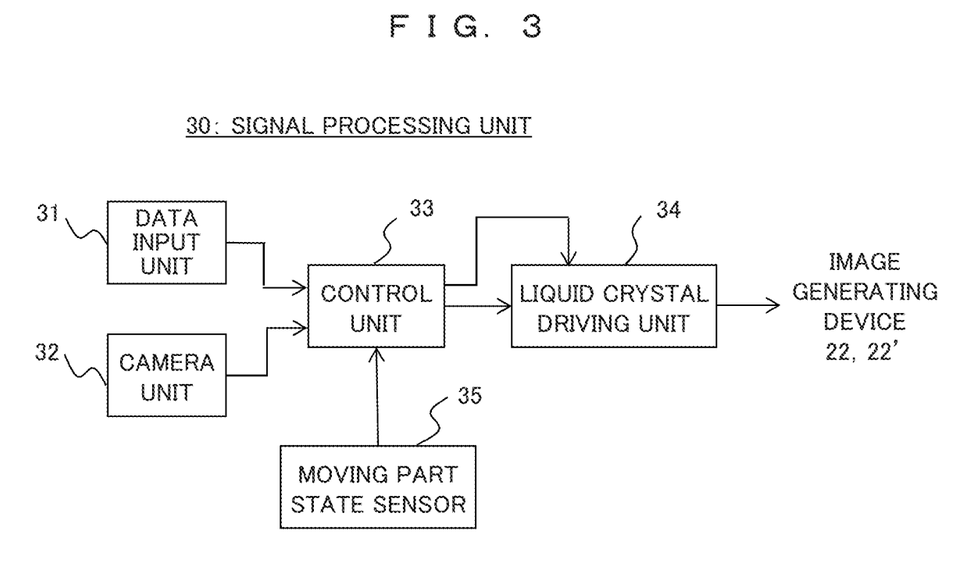
FIG. 3 is a block diagram that illustrates the configuration of a signal processing unit 30 built in an arm 3.

FIG. 3 is a block diagram that illustrates the configuration of a signal processing unit 30 built in each of the arms 3a and 3b. The signal processing unit 30 performs image processing or format processing for image data, converts the image data into display data, and outputs the converted display data to the image display unit 2.

A data input unit 31 inputs image data to be displayed from the outside through radio communication or the like. In addition, image data may be acquired as a captured image from a camera unit 32 or be read and acquired from an internal memory not illustrated in the drawing. A control unit 33 selects image data input from the data input unit 31 or the camera unit 32, performs image processing, converts resultant image data into display data used for the image generating device of the image display unit 2, and transmits the display data to a liquid crystal driving unit 34. The liquid crystal driving unit 34 transmits a driving signal to the image generating device 22 and 22' of the optical system 20 on the basis of the display data.

A moving part state sensor 35 detects states (rotation angle positions) of the moving parts, in other words, whether the first moving part 5 or the second moving part 6 is open or folded. In a case where the moving parts 5 and 6 are detected to be open in accordance with a detection signal acquired by the moving part state sensor 35, the control unit 33 turns on the power of the image display unit 2 to perform a display operation. In a case where the moving parts 5 and 6 are folded, the control unit 33 turns off the power of the image display unit 2 to stop the display operation.

Figure 4A:
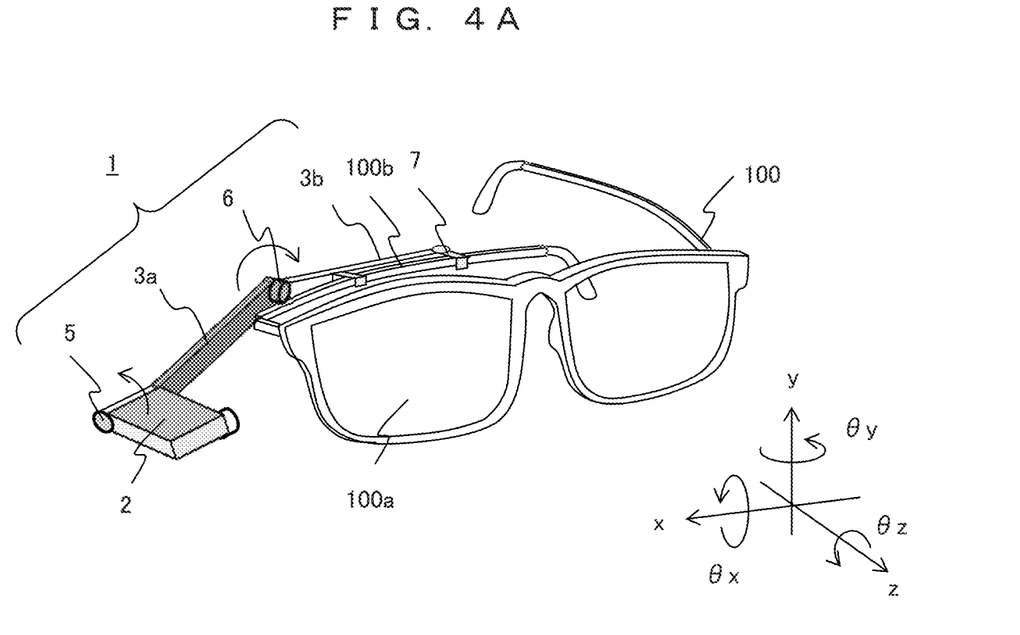
FIG. 4A is a diagram that illustrates a state in which glasses to which an HMD is attached are stored by being folded.
Figure 4B:
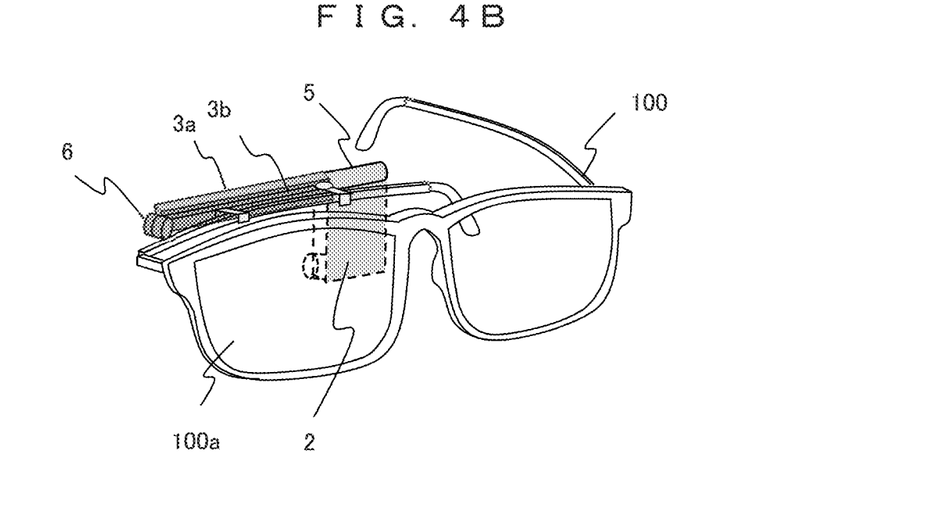
FIG. 4B is a diagram that illustrates a state in which glasses to which an HMD is attached are stored by being folded.

FIGS. 4A and 4B are diagrams that illustrate states in which glasses to which an HMD is attached are stored by being folded. FIG. 4A illustrates a state in which a temple 100*b* (only the right side to which the HMD is attached) of glasses 100 is folded to the inner side, and the HMD 1 is maintained to be in the use state illustrated in FIG. 1. An image display unit 2 arranged in front of glass lens 100*a* protrudes in the direction x from the width of the folded glasses 100. In this state, in a case where the glasses 100 are removed and carried or placed on a table, there is concern that the protruding image display unit 2 may be hit or damaged according to application of an external force. In addition, a user needs to be cautious for the handling of the glasses not to be damaged. Furthermore, the glasses are not inserted into a glass case in this state, and a new storage case is necessary at the time of carrying the glasses. Thus, by operating the moving parts 5, 6, and 7 of the HMD 1, the image display unit 2 is moved to be within the width glasses 100.

FIG. 4B illustrates a state in which the image display unit 2 is stored within the width of the glasses 100 by rotating the moving parts 5, 6, and 7 of the HMD 1. First, the first moving part 5 is rotated by about 90 degrees to rise such that the principal face of the image display unit 2 is approximately in parallel with the direction y. Next, the second moving part 6 is rotated by about 180 degrees such that the arm 3*a* is folded back to the arm 3*b* side. As a result, the image display unit 2 and the arm 3*a* can be housed within the width of the folded glasses 100. In addition, by rotating the third moving part 7 by a predetermined amount, the image display unit 2 can be moved to be placed between the glass lens 100*a* and the temple 100*b* (may be attached such that the heights of the arms 3*a* and 3*b* are positioned on a further lower side than the temple 100*b*). In this way, the glasses can be easily stored in the glass case without causing the HMD 1 protruding from the glasses 100.

In addition, as the sequence of the storage, the HMD 1 may be folded by rotating the moving parts 5, 6, and 7 of the HMD 1 first, and thereafter, the temple 100*b* of the glasses 100 may be folded to the inner side. In such a case, a result of the storage is the same.

In this way, the HMD 1 according to this embodiment employs a structure in which rotation operations in the directions θz, θx, and θy are performed by a plurality of the moving parts 5, 6, and 7 of which the rotation axes are approximately orthogonal to each other, and accordingly, the glasses in the state in which the HMD is attached can be easily folded and stored. In other words, during the rotation operations, there is a feature that the directions of the rotation axis of the first moving part 5 and the rotation axis of the second moving part 6 are approximately orthogonal to each other, and the directions of the rotation axis of the second moving part 6 and the rotation axis of the third moving part 7 are approximately orthogonal to each other.

Next, the structures and the operations of the moving parts 5, 6, and 7 will be described in detail. In description presented below, as the directions of the rotation axes of the moving parts 5, 6, and 7, the directions z, x, and y (θz, θx, and θy) represented in the use state illustrated in FIG. 1 will be used.

Figure 5:
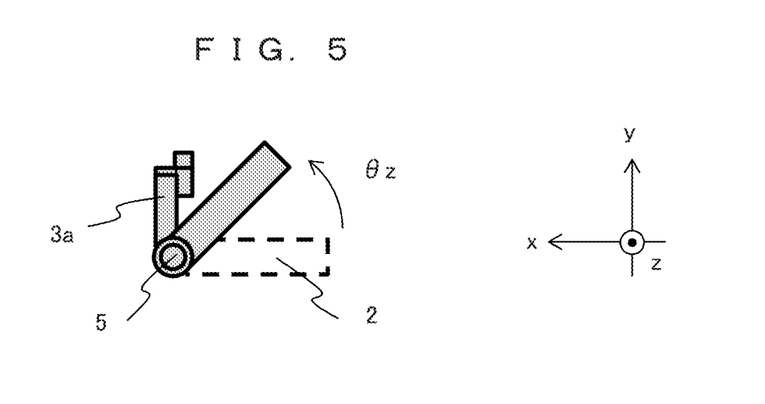
FIG. 5 is diagram that illustrates the structure of a first moving part 5.

FIG. 5 is diagram that illustrates the structure of the first moving part 5, and a rotation axis in the direction z (visual line direction) is included in a joining portion of the image display unit 2 and the arm 3*a*. The first moving part 5 can rotate the image display unit 2 of the HMD 1 in the direction θz by about 90 degrees and can perform switching between a use state and a folded state.

Figure 6:
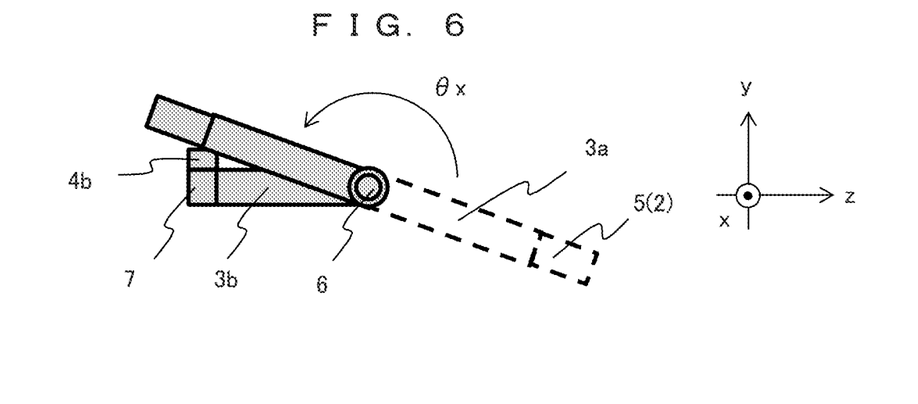
FIG. 6 is a diagram that illustrates the structure of a second moving part 6.

FIG. 6 is a diagram that illustrates the structure of the second moving part 6, and a rotation axis in the direction x (the horizontal direction) is included in a joining portion of the arm 3*a* and the arm 3*b*. The second moving part 6 moves at least the image display unit 2 from the front side to the rear side of the glass lens 100*a* and thus, can rotate the arm 3*a* disposed on the front side in the direction θx by about 180 degrees. This angle depends also on the height (the position in the direction y) of the image display unit 2 in the use state of the HMD 1, and, in a case where the image display unit 2 is positioned downward as illustrated in FIG. 6, there are also cases where a rotation amount θx exceeds 180 degrees.

The second moving part 6 is a mechanism starting an operation after the first moving part 5 is rotated in the direction θz by about 90 degrees from the use state. The reason for sequentially moving the first moving part 5 and the second moving part 6 is for preventing the image display unit 2 from being in contact with the lens 100*a* or the temple 100*b* of the glasses in the middle of the storage. This function may use an instrumentation mechanism or may be realized by a structure performing electrical locking using a sensor or the like.

Figure 7:
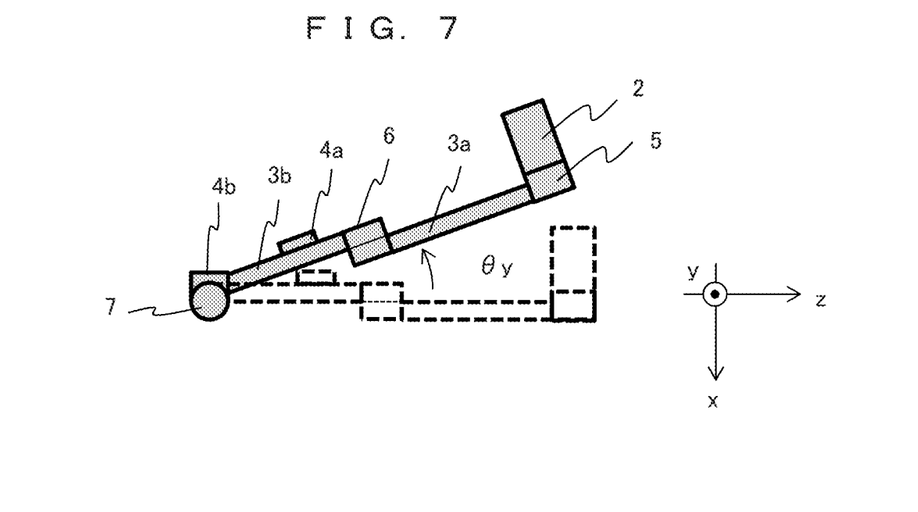
FIG. 7 is a diagram that illustrates the structure of a third moving part 7.

FIG. 7 is a diagram that illustrates the structure of the third moving part 7, and a rotation axis in the direction y (the vertical direction) is included in a joining portion of the arm 3*b* and the attachment part 4*b*. By using the third moving part 7, the image display unit 2 and the arms 3*a* and 3*b* can be moved to the inner side of the temple 100*b* of the glasses 100. In a case where the third moving part 7, for example, can be rotated in the direction θy by about 20 degrees, when the glasses 100 are folded, the HMD 1 can be stored between the lens 100*a* and the temple 100*b* of the glasses.

The third moving part 7 is a mechanism starting an operation after the second moving part 6 is rotated in the direction θx by about 180 degrees from the use state. The reason for sequentially moving the second moving part 6 and the third moving part 7 is for preventing the image display unit 2 from being in contact with the lens 100*a* or the temple 100*b* of the glasses 100 in the middle of the storage.

This function may use an instrumentation mechanism or may be realized by a structure performing electrical locking using a sensor or the like.

Each of the moving parts described above may be modified as below.

The first moving part 5 has a rotation range of about 90 degrees in the direction θz. The reason for this is that the image display unit 2 according to this embodiment has a shape that is the thinnest in the direction y (an xz plane is the principal face) in the use state, and the image display unit 2 may be rotated such that the thinnest direction is the direction x for appropriate storage. However, the rotation range of the first moving part 5 depends on the shape of the image display unit 2. In other words, in the case of the shape that is the thinnest in the direction z (an xy plane is the principal face) in the use state of the image display unit 2, the image display unit 2 may be rotated in the direction θy by about −90 degrees by the first moving part 5 such that the thinnest direction is the direction x. Alternatively, the first moving part 5 may be configured to be an other-axis slidable mechanism such as a ball bearing, and the rotation of 90 degrees in the direction θx and the rotation of 90 degrees in the direction θz may be combined. In any of the cases, the rotation axis of the first moving part 5 and the rotation axis of the second moving part 6 are approximately orthogonal to each other.

Figure 8:
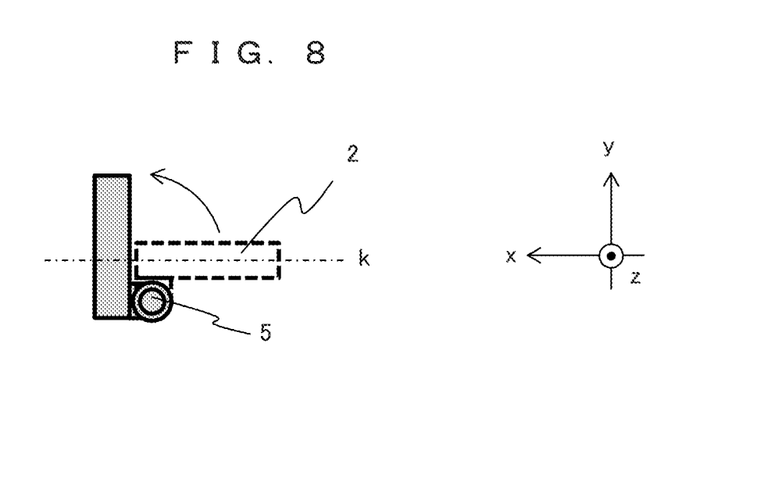
FIG. 8 is a diagram that illustrates a modified example of the structure of the first moving part 5.

FIG. 8 is a diagram that illustrates a modified example of the structure of the first moving part 5. The rotation axis of the first moving part 5 is arranged to be shifted from a center line k of the image display unit 2 by a predetermined distance. Accordingly, when the image display unit 2 is rotated to be in a stored state by the first moving part 5, the projection face of the image display unit 2 in the direction y does not overlap the arm 3a, and an interference therebetween can be prevented.

The second moving part 6 has a moving range of about 180 degrees in the direction θx. This is a condition for moving the position of the image display unit 2 that is in the middle of use from the front side to the rear side of the glass lens 100a and minimizing a portion protruding with respect to the glasses 100 at the time of folding the HMD 1. However, the rotation range of the second moving part 6 is not limited thereto. In other words, also by employing a structure in which the rotation direction of the second moving part 6 is the direction θy, and the second moving part 6 is rotated in the direction θy by −180 degrees, equivalent effects can be acquired.

Figure 9A:
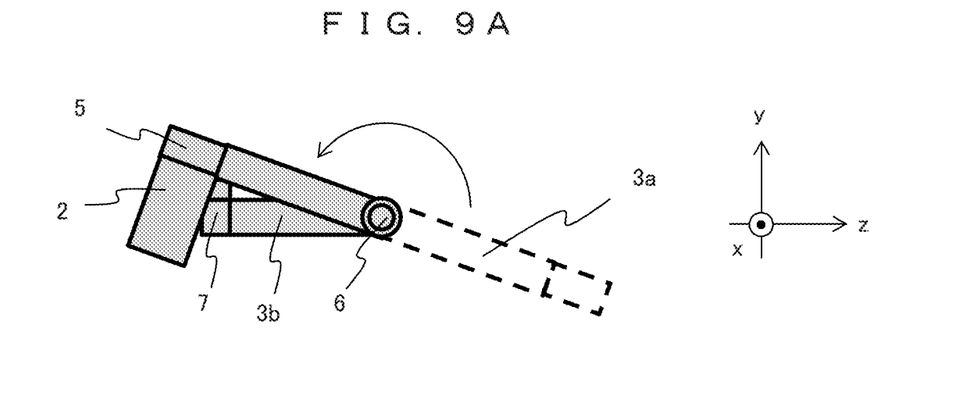
FIG. 9A is a diagram that illustrates a state in which an HMD 1 is folded by the second moving part 6.
Figure 9B:
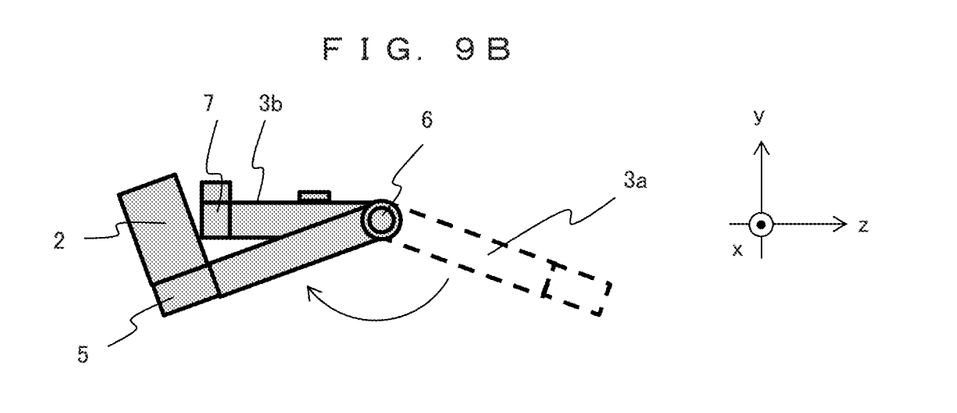
FIG. 9B is a diagram that illustrates a state in which the HMD 1 is folded by the second moving part 6.

FIGS. 9A and 9B are diagrams that illustrate states in which the HMD 1 is folded by the second moving part 6. While FIG. 9A illustrates a case where the arm 3a is moved through the upper side of the second moving part 6, as in the case illustrated in FIG. 9B, the arm 3a may be moved through the lower side of the second moving part 6. In the case illustrated in FIG. 9B, the rotation range of the first moving part 5 may be configured to be from 0 degree to −90 degrees in the direction θz, and the rotation range of the second moving part 6 may be configured to be from 0 degree to −180 degrees.

In addition, in order to respond to a case where the HMD 1 is attached to a left temple of the glasses 100, and the user sees an image using his left eye, the rotation range of the first moving part 5 may be configured to be from −90 degrees to 90 degrees in the direction θz, and the rotation range of the second moving part 6 may be configured to be from −180 degrees to 180 degrees in the direction θx.

Figure 10:
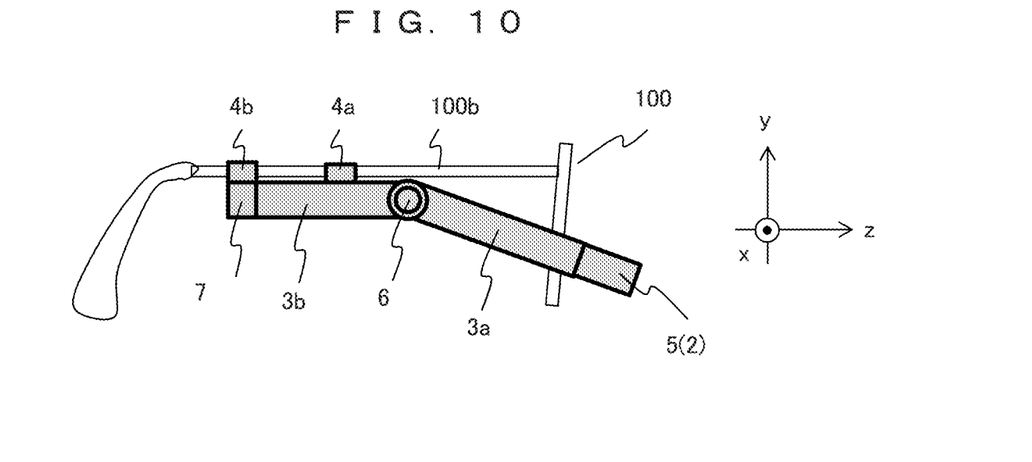
FIG. 10 is a side view that illustrates attachment of an HMD to glasses 100.

FIG. 10 is a side view that illustrates attachment of the HMD 1 to the glasses 100. In order to secure the stability of the HMD 1 at the time of attachment thereof to the glasses 100, the HMD 1 is fixed to the temple 100b of the glasses 100 at two places of the attachment parts 4a and 4b. In this case, the arms 3a and 3b moved by the third moving part 7 in the direction θy attached to have projection faces in the direction x at heights (heights lower than the temple 100b) not overlapping the temple 100b of the glasses. Accordingly, the HMD 1 after the folding of the arm 3a can be moved to the inner side of the temple 100b by rotating the third moving part 7.

Figure 11A:
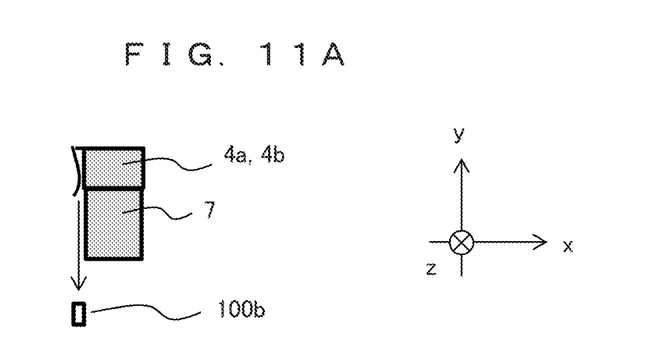
FIG. 11A is a diagram that illustrates the structure of attachment parts 4a and 4b.
Figure 11B:
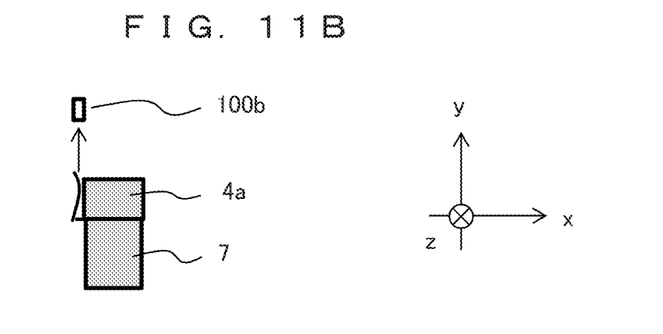
FIG. 11B is a diagram that illustrates the structure of attachment parts 4a and 4b.

FIGS. 11A and 11B are diagrams illustrating the structures of the attachment parts 4a and 4b. FIG. 11A illustrates a structure in which the attachment parts 4a and 4b are attached/detached side to/from the temple 100b of the glasses from the upper side. FIG. 11B illustrates a modified example, and the attachment part 4a, which is disposed on the front side, not brought into contact with the third moving part 7 may have a structure of being attached/detached to/from the temple 100b of the glasses from the lower side. In this case, the rotation operation performed by the third moving part 7 can be performed more simply.

In addition, the first moving part 5 and the second moving part 6 may also serve as a mechanism adjusting the height and the angle of an image seen by the user. In other words, by finely moving the first moving part 5, the height of an image, which is emitted from the display surface 2a, in the direction y can be adjusted, and, by finely moving the second moving part 6, the emission angle of the image, which is emitted from the display surface 2a, can be adjusted.

Figure 12:
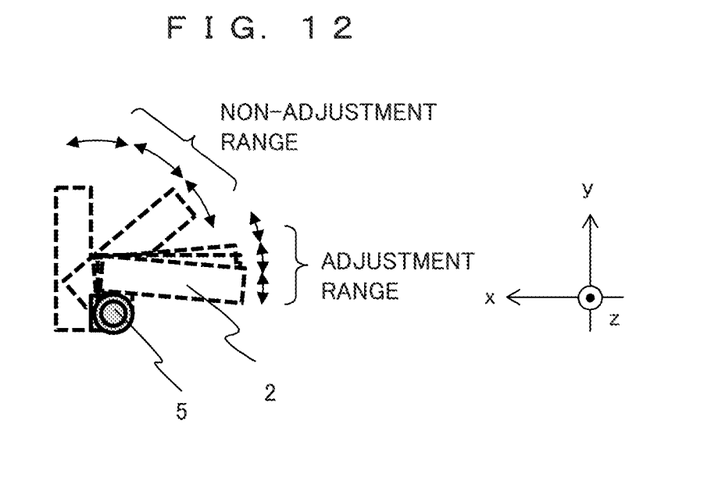
FIG. 12 is a diagram that illustrates a rotation adjustment range of the first moving part 5.

FIG. 12 is a diagram that illustrates a rotation adjustment range of the first moving part 5. The first moving part 5 is in the case of being a mechanism (a mechanism of which stop positions are discretely present) rotating not continuously but discretely. In adjustment ranges of the height and the angle of the display surface 2a, the operation interval (stop interval) of the moving part 5 may be decreased to enable fine adjustment, and, in the other non-adjustment range, the operation interval may be increased. Although not illustrated in the drawings, this similarly applies also to the second moving part 6 and the third moving part 7.

In addition, the operation of the first moving part 5 and the power or the display output operation of the image display unit 2 may be configured to be linked with each other. For this reason, the moving part state sensor 35 (see FIG. 3) detecting the rotation range is installed in the first moving part 5, and it is detected whether the image display unit 2 is open (use state) or folded (stored state) by using the first moving part 5. A detection signal is transmitted to the signal processing unit 30, and the control unit 33 performs control such that the power or the display output operation of the image display unit 2 is turned on in the case of the use state. On the other hand, in the case of the stored state or rotation exceeding the adjustment range, the control unit 33 performs control such that the power or the display output operation of the image display unit 2 is turned off.

Similarly, the operation of the second moving part 6 and the power or the display output operation of the image display unit 2 may be linked with each other. By employing such a configuration, unnecessary power consumption of the HMD 1 can be decreased.

According to Embodiment 1, by arranging a plurality of moving parts of which the rotation axes are orthogonal to each other in the HMD, even when the glasses are folded, protrusion of a part of the HMD from the glasses can be prevented. Accordingly, a damage occurring at the time of storing glasses to which the HMD is attached is prevented, and there is an effect of allowing easy handling.

Embodiment 2

In Embodiment 2, the second moving part 6 according to Embodiment 1 has a structure that is extendible and contractible in the visual line direction (the direction of the z axis).

Figure 13:
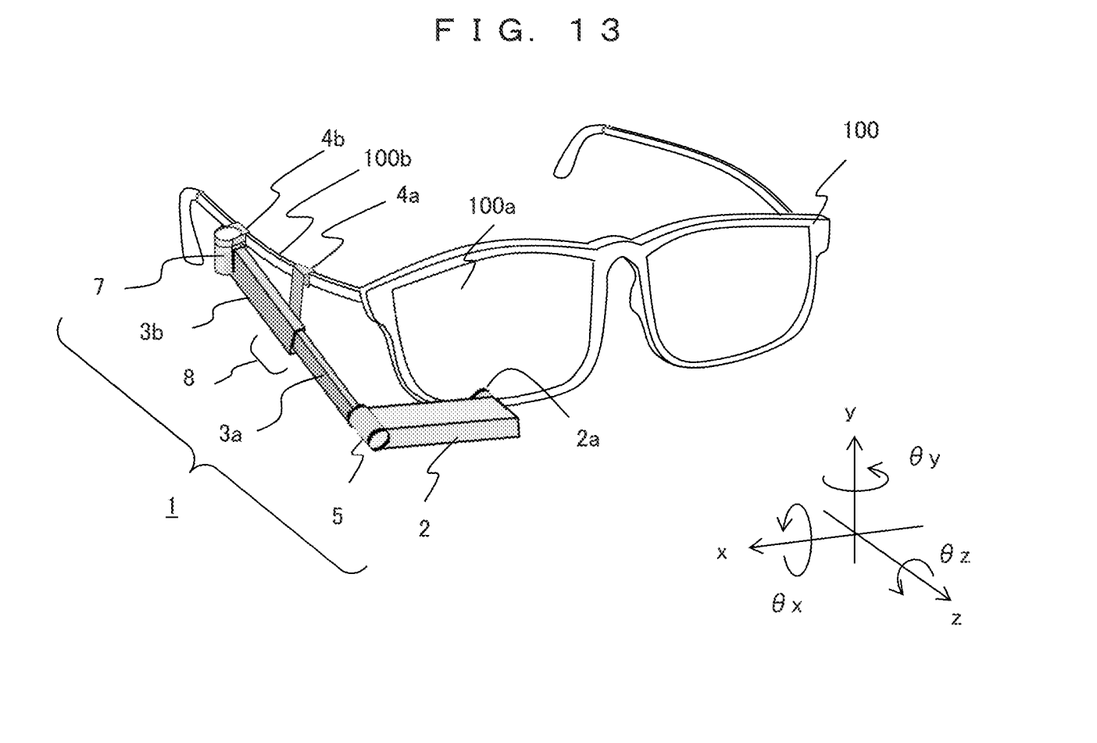
FIG. 13 is a perspective view that illustrates a head-mounted display device according to Embodiment 2.

FIG. 13 is a perspective view that illustrates a head-mounted display device (HMD) according to Embodiment 2 and illustrates a use state in which the HMD is attached to glasses. In the case illustrated in FIG. 13, an extending/contracting mechanism (sliding mechanism) is employed in the second moving part 8, and an arm 3a is extendible and contractible in the longitudinal direction (direction z) with respect to an arm 3b. The other first and third moving parts 5 and 7, similar to those according to Embodiment 1 (FIG. 1), are rotation mechanisms. The extending/contracting direction of the second moving part 8 is approximately parallel to the direction of the rotation axis of the first moving part 5. In addition, the extending/contracting direction of the second moving part 8 is approximately orthogonal to the direction of the rotation axis of the third moving part 7.

Figure 14A:
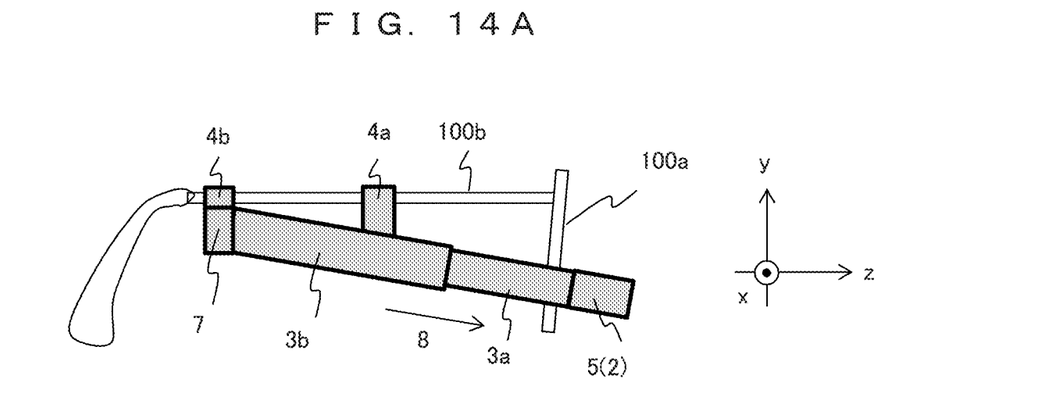
FIG. 14A is a side view that illustrates the operation of a second moving part 8.
Figure 14B:
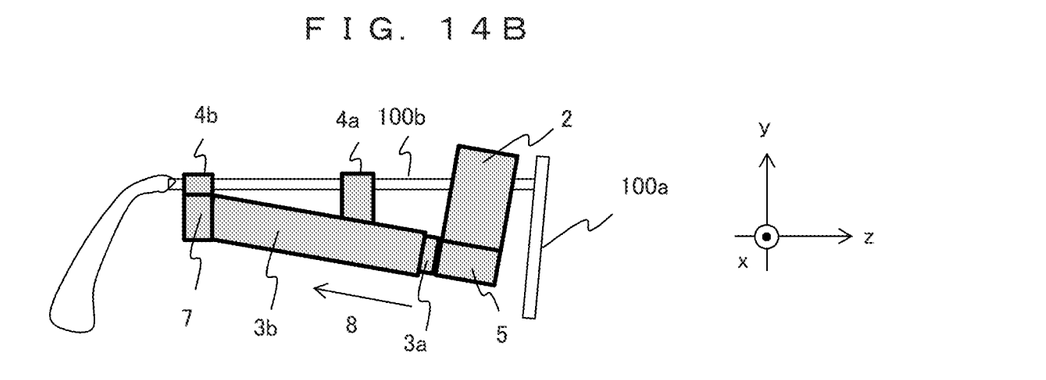
FIG. 14B is a side view that illustrates the operation of the second moving part 8.

FIGS. 14A and 14B are side views that illustrate the operations of the second moving part 8. FIG. 14A illustrates an extended state of the moving part 8, and FIG. 14B illustrates a contracted state of the moving part 8. The second moving part 8 is a mechanism that connects the arms 3a and 3b and slides the arm 3a disposed on the front side in the direction z to be drawn out from or pressed to the arm 3b disposed on the rear side. By contracting the second moving part 8, an image display unit 2 supported by the arm 3a can be moved to the rear side of glass lens 100a.

The second moving part 8 has a structure that is extendible and contractible at least in a range in which the image display unit 2 is moved from the front side of the glass lens 100a to a position located on the rear side thereof. In addition, the second moving part 8 is a mechanism starting an extending/contracting operation after the image display unit 2 is rotated by the first moving part 5 in the direction θz by about 90 degrees from the use state. The reason for sequentially operating the first moving part 5 and the second moving part 8 is for preventing the image display unit 2 from being brought into contact with the lens 100a or the temple 100b of the glasses 100. This function may use an instrumentation mechanism or may be realized by a structure performing electrical locking using a sensor or the like. The third moving part 7 is a mechanism starting an operation after the second moving part 8 moves the image display unit 2 to the rear side of the glass lens 100a.

Figure 15A:
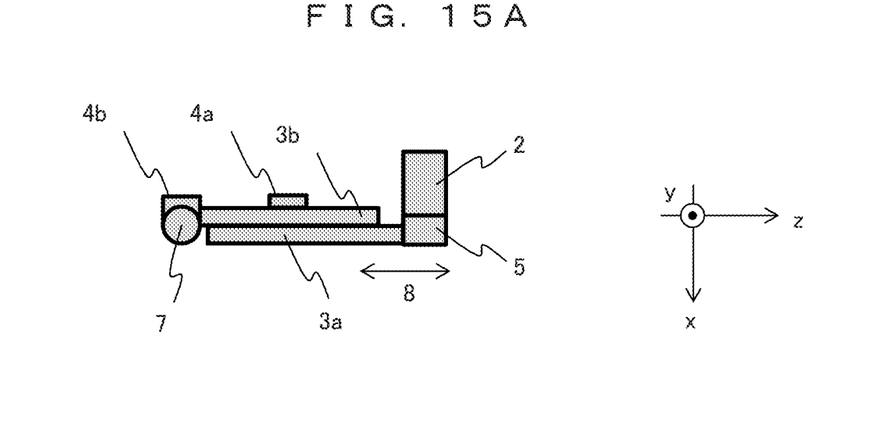
FIG. 15A is a top view that illustrates the structure of the second moving part 8.
Figure 15B:
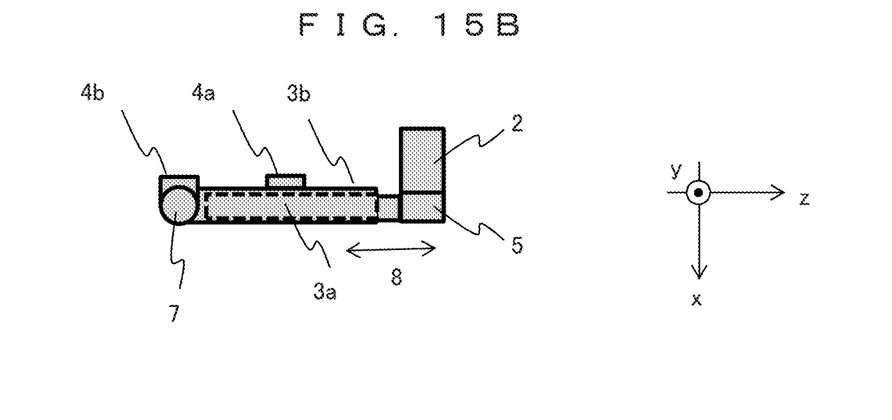
FIG. 15B is a top view that illustrates the structure of the second moving part 8.

FIGS. 15A and 15B are top views that illustrate the structure of the second moving part 8. FIG. 15A illustrates a case where a structure in which the arms 3a and 3b are adjacently slid is employed. FIG. 15B is a case where a structure in which the arm 3a enters or exits from the inside of the arm 3b is employed. In the case illustrated in FIG. 15B, since the arm 3a is stored inside the arm 3b, a signal processing unit 30 generating display data of the image display unit 2 is built in the arm 3a side. It is apparent that a structure in which the arm 3b enters or exits from the inside of the arm 3a may be employed.

In Embodiment 2, the height (y-direction position) of the image display unit 2 (display unit 2a) with respect to the glasses 100 is positioned by attaching the arms 3a and 3b to be inclined with respect to the temple 100b of the glasses by a predetermined angle. In addition, in a case where fine adjustment of the height is necessary, the attachment part 4a may have a structure slidable with respect to the arm 3b in the direction y, and the attachment part 4b may have a structure that can be finely moved in the direction θx.

Figure 16:
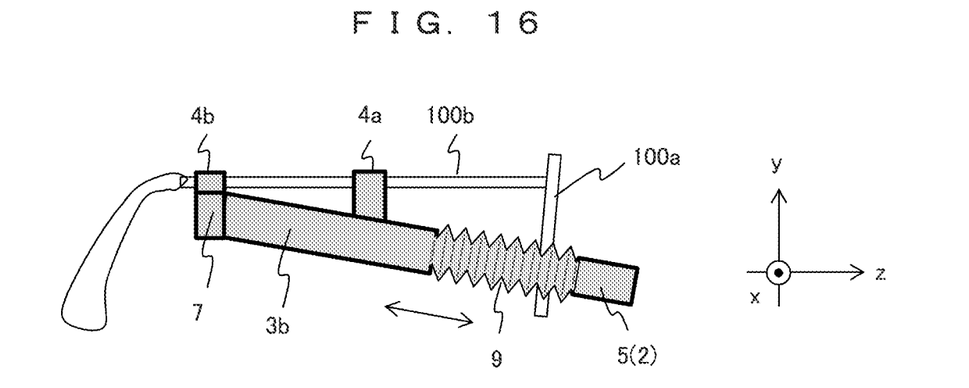
FIG. 16 is a diagram that illustrates a modified example of the second moving part 8.

FIG. 16 is a diagram that illustrates a modified example of the second moving part 8 and illustrates a case where a bellows structure 9 is employed. A portion of the arm 3a disposed on the front side is replaced by the bellows structure 9 that is extendible and contractible. The bellows structure 9 can be not only extended and contracted in the direction z but also finely moved in the direction x and the direction y in accordance with an external force and can maintain the position after the fine movement, whereby the position adjustment can be permed more easily. In addition, the bellows structure 9 may be employed not in a portion of the arm 3a disposed on the front side but in a portion of the arm 3b disposed on the rear side or may be employed in both the arms disposed on the front and rear sides.

Furthermore, in a case where the bellows structure 9 has a function for drilling rotation in the direction θz, the first moving part 5 rotating the image display unit 2 may be omitted. In addition, since the image display unit 2 can be moved to a further inner side than the temple 100b of the glasses by using the bellows structure 9, in a case where the protruding amount of the arm 3b from the temple 100b is of a degree not obstructing the storage, the third moving part 7 may be omitted as well.

Also in Embodiment 2, by arranging a plurality of moving parts of which the extending/contracting directions are approximately parallel to the rotation axis of the HMD, even when the glasses are folded, protrusion of a part of the HMD from the glasses can be prevented. Accordingly, a damage occurring at the time of storing the glasses to which the HMD is attached is prevented, and there is an effect enabling easy handling.

REFERENCE SIGNS LIST

1: Head mounted display device (HMD)
2: Image display unit
2a: Display surface
3a and 3b: Arm
4a and 4b: Attachment part
5: First moving part (rotation mechanism)
6: Second moving part (rotation mechanism)
7: Third moving part (rotation mechanism)
8: Second moving part (extending/contracting mechanism)
9: Second moving part (bellows mechanism)
20: Optical system
30: Signal processing unit
35: Moving part state sensor
100: Glasses
100a: Lens of glasses
100b: Temple (side) of glasses

The invention claimed is:
1. A head-mounted display device that is to be attached to glasses, the head-mounted display device comprising:
an image display unit that displays an image;
an arm that supports the image display unit; and
an attachment part that attaches the arm to the glasses,
wherein the arm is formed by a first arm portion supporting the image display unit and a second arm portion bonded to the attachment part and includes: a first moving part that can rotate the image display unit with respect to the first arm portion; and a second moving part that can rotate the first arm portion to be folded back with respect to the second arm portion, wherein directions of a rotation axis of the first moving part and a rotation axis of the second moving part are approximately orthogonal to each other, and wherein at least one of the first moving part and the second moving part, in order to rotate the first arm portion or the second arm portion discretely at an interval of a predetermined angle, includes a stop mechanism constructed or arranged to vary the interval of the angle according to a rotation angle position, the head-mounted display device further comprising a moving part state sensor that detects a rotation angle position of the first moving part or the second moving part, wherein power of the image display unit is turned on in a case where the rotation angle position of the moving part detected by the moving part state sensor is within a range in which the image display unit is located on the side opposite to the attachment part with respect to the lens surface of the glasses and is turned off in a case where the rotation angle position is outside the range.

2. The head-mounted display device according to claim 1, further comprising a third moving part that can rotate the second arm portion with respect to the attachment part, wherein the direction of the rotation axis of the second moving part and a direction of a rotation axis of the third moving part are approximately orthogonal to each other.

3. The head-mounted display device according to claim 2, further comprising:

a mechanism that enables a rotation operation of the second moving part only in a case where the first moving part is in a predetermined rotation angle range; and a mechanism that enables a rotation operation of the third moving part only in a case where the second moving part is in a predetermined rotation angle range.

4. The head-mounted display device according to claim 1, further comprising a mechanism that enables a rotation operation of the second moving part only in a case where the first moving part is in a predetermined rotation angle range.

5. The head-mounted display device according to claim 1, wherein a rotation angle range of the first moving part is about 90 degrees, and a rotation angle range of the second moving part is about 180 degrees.

6. The head-mounted display device according to claim 1, wherein the arm has a signal processing unit transmitting display data to the image display unit built therein, and wherein the image display unit has an optical system converting the display data input from the signal processing unit into a display image built therein.

7. The head-mounted display device according to claim 1, wherein the attachment parts fix the second arm portion to the glasses at at least two places, and wherein at least one of the attachment parts has a structure in which the second arm portion is attached or detached from a lower side of the glasses.

8. A head-mounted display device that is to be attached to glasses, the head-mounted display device comprising:

an image display unit that displays an image;
an arm that supports the image display unit; and
an attachment part that attaches the arm to the glasses,
wherein the arm is formed by a first arm portion supporting the image display unit and a second arm portion bonded to the attachment part and includes: a first moving part that can rotate the image display unit with respect to the first arm portion; and a second moving part that can extend or contract the first arm portion in a longitudinal direction with respect to the second arm portion, and wherein a direction of a rotation axis of the first moving part and an extending/contracting direction of the second moving part are approximately parallel to each other, wherein an extending/contracting operation of the second moving part can be performed only in a case where the first moving part is in a rotation angle range where the image display unit is not located on the front side of the lens of the glasses, in the state where the head-mounted display device is attached to the glasses; and the head-mounted display device a moving part state sensor that detects a rotation angle position of the first moving part or the second moving part, wherein power of the image display unit is turned on in a case where the rotation angle position of the moving part detected by the moving part state sensor is within a range in which the image display unit is located on the side opposite to the attachment part with respect to the lens surface of the glasses and is turned off in a case where the rotation angle position is outside the range.

9. The head-mounted display device according to claim 8, further comprising a third moving part that can rotate the second arm portion with respect to the attachment part, wherein the extending/contracting direction of the second moving part and a direction of a rotation axis of the third moving part are approximately orthogonal to each other.

10. The head-mounted display device according to claim 9, further comprising:

a mechanism that enables an extending/contracting operation of the second moving part only in a case where the first moving part is in a predetermined rotation angle range; and a mechanism that enables a rotation operation of the third moving part only in a case where the second moving part is located at a predetermined extension/contraction position.

11. The head-mounted display device according to claim 8, wherein the second moving part has a structure in which the first arm portion enters or exits from the inside of the second arm portion.

12. The head-mounted display device according to claim 8, wherein the second moving part extends or contracts the first arm portion as a bellows structure.

* * * * *